(12) United States Patent
Mukherjee et al.

(10) Patent No.: US 10,524,281 B2
(45) Date of Patent: Dec. 31, 2019

(54) NETWORK NODE, WIRELESS DEVICE AND METHODS THEREIN, FOR SCHEDULING ONE OR MORE BEARERS AND APPLYING A LISTEN-BEFORE-TALK SETTING, RESPECTIVELY

(71) Applicant: GUANGDONG OPPO MOBILE TELECOMMUNICATIONS CORP., LTD., Dongguan (CN)

(72) Inventors: Amitav Mukherjee, Fremont, CA (US); Jung-Fu Cheng, Fremont, CA (US); Havish Koorapaty, Saratoga, CA (US); Daniel Larsson, Stockholm (SE); Sorour Falahati, Stockholm (SE); Yu Yang, Solna (SE)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 130 days.

(21) Appl. No.: 15/510,746

(22) PCT Filed: Nov. 3, 2015

(86) PCT No.: PCT/SE2015/051158
§ 371 (c)(1),
(2) Date: Mar. 13, 2017

(87) PCT Pub. No.: WO2016/072917
PCT Pub. Date: May 12, 2016

(65) Prior Publication Data
US 2018/0317246 A1      Nov. 1, 2018

Related U.S. Application Data

(60) Provisional application No. 62/076,677, filed on Nov. 7, 2014.

(51) Int. Cl.
*H04W 72/12* (2009.01)
*H04W 74/08* (2009.01)
(Continued)

(52) U.S. Cl.
CPC ... *H04W 72/1236* (2013.01); *H04W 72/0446* (2013.01); *H04W 74/0816* (2013.01); *H04W 16/14* (2013.01)

(58) Field of Classification Search
CPC . H04W 72/1236; H04W 72/0406–042; H04W 72/044–0453; H04W 74/0808–0858; H04W 16/14
See application file for complete search history.

(56) References Cited

U.S. PATENT DOCUMENTS 8,774,209 B2    7/2014  Sadek et al.
2013/0343288 A1  12/2013  Ratasuk et al.
(Continued)

FOREIGN PATENT DOCUMENTS

WO    2014064322 A1    5/2014

OTHER PUBLICATIONS

Ericsson: 3GPP TSG RAN WG1 Meeting #82bis, "On Framework and Parameters for Category-4 LBT for DL-only LAA", Sweden, Oct. 5-9, 2015, R1-156035, 4 pages.
(Continued)

*Primary Examiner* — Eric Myers
(74) *Attorney, Agent, or Firm* — Finnegan, Henderson, Farabow, Garrett & Dunner, LLP

(57) ABSTRACT

Method performed by a network node for scheduling one or more bearers for transmission to or from a wireless device. The wireless device is serviced by the network node. The network node calculates a weight for each bearer of the one or more bearers. The calculating is based on an indication of a quality of service associated with information to be
(Continued)

transmitted in each bearer of the one or more bearers. The network node schedules the one or more bearers for transmission to or from the wireless device based on the calculated weight. The calculated weight corresponds to a Listen-Before-Talk, LBT, setting. The LBT setting comprises an LBT algorithm and its corresponding one or more parameters.

14 Claims, 11 Drawing Sheets

(51) Int. Cl.
*H04W 72/04* (2009.01)
*H04W 16/14* (2009.01)

(56) References Cited

U.S. PATENT DOCUMENTS

2014/0078970 A1  3/2014  Guo et al.
2015/0296384 A1* 10/2015  Sadek ............... H04W 16/14
                                         455/452.1

OTHER PUBLICATIONS

Office Action for European Patent Application No. 15807713.1 dated Jul. 11, 2018, 10 pages.
Author Unknown, "Broadband Radio Access Networks (BRAN); 5 GHz high performance RLAN; Harmonized EN covering the essential requirements of article 3.2 of the R&TTE Directive," ETSI EN 301 893, Version 1.7.1, European Telecommunications Standards Institute, Jun. 2012, 90 pages.
Author Unknown, "IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Standards Association, IEEE Std 802.11™—2012, Revision of IEEE Std 802.11-2007, Mar. 29, 2012, New York, New York, The Institute of Electrical and Electronics Engineers, Inc., 2793 pages.
Author Unknown, "Technical Specification Group Radio Access Network; Evolved Universal Terrestrial Radio Access (E-UTRA); Physical channels and modulation (Release 11)," Technical Specification 36.211, Version 11.4.0, 3GPP Organizational Partners, Sep. 2013, 120 pages.
Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
International Search Report and Written Opinion for International Patent Application No. PCT/SE2015/051158, dated May 12, 2016, 21 pages.
Extended european Search Report, dated Sep. 18, 2019 in counterpart European Application No. 19187449.4 (7 pages).
Extended European Search Report dated Oct. 24, 2019 in counterpart European Application No. 19187452.8.
Extended European Search Report dated Oct. 24, 2019 in counterpart European Application No. 19187448.6.

* cited by examiner

NETWORK NODE, WIRELESS DEVICE AND METHODS THEREIN, FOR SCHEDULING ONE OR MORE BEARERS AND APPLYING A LISTEN-BEFORE-TALK SETTING, RESPECTIVELY

This application is a 35 U.S.C. § 371 national phase filing of International Application No. PCT/SE2015/051158, filed Nov. 3, 2015, which claims the benefit of U.S. Provisional Application No. 62/076,677, filed Nov. 7, 2014, the disclosures of which are incorporated herein by reference in their entireties.

TECHNICAL FIELD

The present disclosure relates generally to a network node and methods therein for scheduling one or more bearers for transmission to or from a wireless device. The present disclosure relates generally also to a wireless device and methods therein for applying a Listen-Before-Talk, LBT, setting. The present disclosure also relates generally to a computer program product, comprising instructions to carry out the actions described herein, as performed by the network node. The computer program product may be stored on a computer-readable storage medium.

BACKGROUND

Communication devices such as wireless devices are also known as e.g. User Equipments (UE), mobile terminals, terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. evolved NodeB "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP initiative "Licensed Assisted Access" (LAA) intends to allow LTE equipment to also operate in the unlicensed 5 GHz radio spectrum. The unlicensed 5 GHz spectrum is used as a complement to the licensed spectrum. Accordingly, devices may connect in the licensed spectrum, primary cell or PCell, and use carrier aggregation to benefit from additional transmission capacity in the unlicensed spectrum, secondary cell or SCell. To reduce the changes that may be required for aggregating licensed and unlicensed spectrum, the LTE frame timing in the primary cell may be simultaneously used in the secondary cell.

Regulatory requirements, however, may not permit transmissions in the unlicensed spectrum without prior channel sensing. Since the unlicensed spectrum may be shared with other radios of similar or dissimilar wireless technologies, a so called Listen-Before-Talk (LBT) method may need to be applied. Today, the unlicensed 5 GHz spectrum is mainly used by equipment implementing the IEEE 802.11 Wireless Local Area Network (WLAN) standard. This standard is known under its marketing brand "Wi-Fi."

In Europe, the LBT procedure is under the scope of EN 301.893 regulation. For LAA to operate in the 5 GHz spectrum, the LAA LBT procedure may conform to requirements and minimum behaviors set forth in EN 301.893. However, additional system designs and steps may be needed to ensure coexistence of Wi-Fi and LAA with EN 301.893 LBT procedures.

In U.S. Pat. No. 8,774,209B2, "Apparatus and method for spectrum sharing using listen-before-talk with quiet periods," LBT is adopted by frame-based OFDM systems to determine whether the channel is free prior to transmission. A maximum transmission duration timer is used to limit the duration of a transmission burst, and is followed by a quiet period.

Long Term Evolution (LTE)

LTE uses Orthogonal Frequency Division Multiplexing (OFDM) in the downlink and Discrete Fourier Transform (DFT)-spread OFDM, also referred to as single-carrier Frequency Division Multiple-Access (FDMA), in the uplink. The basic LTE downlink physical resource may thus be seen as a time-frequency grid as illustrated in FIG. 1, where each resource element corresponds to one OFDM subcarrier during one OFDM symbol interval. The uplink subframe has the same subcarrier spacing as the downlink and the same number of Single-Carrier (SC)-FDMA symbols in the time domain as OFDM symbols in the downlink.

In the time domain, LTE downlink transmissions may be organized into radio frames of 10 millisecond (ms), each radio frame consisting of ten equally-sized subframes of length Tsubframe=1 ms, as shown in FIG. 2. For normal cyclic prefix, one subframe consists of 14 OFDM symbols. The duration of each symbol may be approximately 71.4 μs.

Furthermore, the resource allocation in LTE is typically described in terms of resource blocks, where a resource block corresponds to one slot, 0.5 ms, in the time domain and 12 contiguous subcarriers in the frequency domain. A pair of two adjacent resource blocks in time direction, 1.0 ms, may be known as a resource block pair. Resource blocks may be numbered in the frequency domain, starting with 0 from one end of the system bandwidth.

Downlink transmissions may be dynamically scheduled, i.e., in each subframe the base may station transmit control information about which terminals data is transmitted to and upon which resource blocks the data is transmitted, in the current downlink subframe. This control signaling may be typically transmitted in the first 1, 2, 3 or 4 OFDM symbols in each subframe, and the number n=1, 2, 3 or 4 may be known as the Control Format Indicator (CFI). The downlink subframe may also contain common reference symbols, which are known to the receiver and used for coherent demodulation of, e.g., the control information. A downlink system with CFI=3 OFDM symbols as control is illustrated in FIG. 3, where the three OFDM symbols are indicated as control region. In the example shown in the figure, the control signaling is transmitted in the first OFDM symbol, as indicated.

Descriptions for the above procedures may be found for example in 3GPP TS 36.211, V11.4.0 (2013-09), 3rd Generation Partnership Project; Technical Specification Group Radio Access Network; Evolved Universal Terrestrial Radio Access (E-UTRA); Physical Channels and Modulation, Release 11, 3GPP TS 36.213, V11.4.0 (2013-09), 3rd Generation Partnership Project; Technical Specification Group Radio Access Network; Evolved Universal Terrestrial Radio Access (E-UTRA); Physical layer procedures, Release 11, and 3GPP TS 36.331, V11.5.0 (2013-09), 3rd Generation Partnership Project; Technical Specification Group Radio Access Network; Evolved Universal Terrestrial Radio Access (E-UTRA); Radio Resource Control (RRC), Release 11.

From LTE Rel-11 onwards, above described resource assignments may also be scheduled on the enhanced Physical Downlink Control Channel (EPDCCH). For Rel-8 to Rel-10, only the Physical Downlink Control Channel (PDCCH) may be available.

The reference symbols shown in the above FIG. 3 may be the cell specific reference symbols (CRS) and may be used to support multiple functions, including fine time and frequency synchronization and channel estimation for certain transmission modes.

Carrier Aggregation

The LTE Rel-10 standard may support bandwidths larger than 20 MegaHertz (MHz). One feature on LTE Rel-10 may be to assure backward compatibility with LTE Rel-8. This may also include spectrum compatibility. That may imply that an LTE Rel-10 carrier, wider than 20 MHz, may appear as a number of LTE carriers to an LTE Rel-8 terminal. Each such carrier may be referred to as a Component Carrier (CC). In particular, for early LTE Rel-10 deployments it may be expected that there may be a smaller number of LTE Rel-10-capable terminals, compared to many LTE legacy terminals. Therefore, it may be necessary to assure an efficient use of a wide carrier also for legacy terminals, i.e. that it may be possible to implement carriers where legacy terminals may be scheduled in all parts of the wideband LTE Rel-10 carrier. The straightforward way to obtain this may be by means of Carrier Aggregation (CA). CA may imply that an LTE Rel-10 terminal may receive multiple CC, where the CC have, or at least the possibility to have, the same structure as a Rel-8 carrier. CA is illustrated in FIG. 4. Note an aggregated bandwidth of 100 MHz is shown as an aggregation of five component carriers, each of 20 MHz. Each of which may therefore be handled by a terminal from an earlier release than LTE Rel-10. A CA-capable UE may be assigned a primary cell (PCell) which may be always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. The number of CCs configured in a cell may be different from the number of CCs seen by a terminal: A terminal may for example support more downlink CCs than uplink CCs, even though the cell is configured with the same number of uplink and downlink CCs.

In addition, a feature of carrier aggregation is the ability to perform cross-carrier scheduling. This mechanism may allow a (E)PDCCH on one CC to schedule data transmissions on another CC by means of a 3-bit Carrier Indicator Field (CIF) inserted at the beginning of the (E)PDCCH messages. For data transmissions on a given CC, a UE may expect to receive scheduling messages on the (E)PDCCH on just one CC—either the same CC, or a different CC via cross-carrier scheduling; this mapping from (E)PDCCH to PDSCH may also be configured semi-statically.

Quality of Service (QoS) in LTE

In LTE, each UE may run several applications of different priorities at the same time. For example, Voice over Internet Protocol (VoIP) and Radio Resource Control (RRC) signaling may typically have a higher priority than File Transfer Protocol (FTP) file downloading. In order to support multiple applications with different QoS requirements, different bearers may be set up associated with different QoS, where different bearers may have distinctive packet loss rate and packet delay requirements for example. Each bearer may have a QoS Class Identifier (QCI) and may be a Guaranteed Bit Rate (GBR) or Non-Guaranteed Bit Rate (Non-GBR) bearer. The standardized 3GPP QCI for LTE is given in Table 1.

TABLE 1

3GPP QCI for LTE

| QCI | Resource Type | Priority | Packet Delay Budget | Packet Loss Rate | Example Services |
|---|---|---|---|---|---|
| 1 | GBR | 2 | 100 ms | $10^{-2}$ | Conversational Voice |
| 2 |  | 4 | 150 ms | $10^{-3}$ | Conversational Video (Live Streaming) |
| 3 |  | 5 | 300 ms | $10^{-6}$ | Non-Conversational Video (Buffered Streaming) |
| 4 |  | 3 | 50 ms | $10^{-3}$ | Real Time Gaming |
| 5 | Non-GBR | 1 | 100 ms | $10^{-6}$ | IMS Signaling |
| 6 |  | 7 | 100 ms | $10^{-3}$ | Voice, Video (Live Streaming) Interactive Gaming |
| 7 |  | 6 | 300 ms | $10^{-6}$ | Video (Buffered Streaming) |
| 8 |  | 8 |  |  | TCP-based (e.g., www, email, chat, ftp, p2p file sharing, progressive video, etc.) |
| 9 |  | 9 |  |  |  |

The QCIs may be defined with certain services in mind, whereas QCI may have impact on how an individual packet of an Evolved Universal Terrestrial Radio Access Network (E-UTRAN) Radio Access Bearer (E-RAB) is treated, by means of for instance the Priority field. In total, 9 QCIs are standardized together with specific values on a few parameters, resource type, priority, packet delay budget, packet error loss rate. The standardized parameters may be interpreted on a guideline level and the values in the QCI Table are not requirements.

Wireless Local Area Network

In typical deployments of WLAN, Carrier Sense Multiple Access with Collision Avoidance (CSMA/CA) may be used for medium access. This means that the channel may be sensed to perform a Clear Channel Assessment (CCA), and a transmission may be initiated only if the channel is declared as Idle. In case the channel is declared as Busy, the transmission may be deferred until the channel is deemed to be Idle. When the range of several Access Points (APs) using the same frequency may overlap, this means that all transmissions related to one AP may be deferred in case a transmission on the same frequency to or from another AP which is within range may be detected. Effectively, this means that if several APs are within range, they may have to share the channel in time, and the throughput for the individual APs may be severely degraded. A general illustration of the Listen-Before-Talk (LBT) mechanism in Wi-Fi is shown in FIG. 5.

After a W-Fi station (STA) A transmits a data frame to a station B, represented in the figure by the two wavy lines and the indication Busy Wireless Medium (WM), station B may transmit the ACK frame back to station A with a delay of 16 microseconds (µs), the so-called Short Inter-frame Spacing (SIFS). The SIFS duration may be understood as representing the nominal time, in µs, that the W-Fi Medium Access Control (MAC) and PHysical Layer (PHY) may require in order to receive the last symbol of a frame at the air interface, process the frame, and respond with the first symbol on the air interface of the earliest possible response frame. Such an ACK frame may be transmitted by station B without performing an LBT operation. To prevent another station interfering with such an ACK frame transmission, a station may defer for a duration of 34 µs, referred to as Distributed Coordination Function Inter-frame Spacing (DIFS), after the channel is observed to be occupied before assessing again whether the channel is occupied. This is represented in FIG. 5 as defer access.

Therefore, a station that wishes to transmit, may first perform a CCA by sensing the medium for a fixed duration DIFS. If the medium is idle, then the station may assume that it may take ownership of the medium and begin a frame exchange sequence. If the medium is busy, the station may wait for the medium to go idle, defer for DIFS, and wait for a further random backoff period.

To further prevent a station from occupying the channel continuously and thereby prevent other stations from accessing the channel, it may be required for a station wishing to transmit again after a transmission is completed to perform a random backoff. The random backoff is a procedure performed based on a so called Contention Window, wherein a random number of slots wherein the channel is to be found idle before transmission may take place is drawn from the range that may be specified by the Contention Window. This number may be counted down as long as the medium is found to be idle, and the counter may be frozen when the medium is found to be busy. When the count goes down to zero, transmission, e.g., of data, as shown in the Figure, may start. The Contention Window may be increased if previous transmissions are not received successfully by the intended recipient, or reset to a nominal value when previous transmissions are received successfully.

The Point Coordination Function Inter-frame Spacing (PIFS) may be used to gain priority access to the medium, and may be shorter than the DIFS duration. Among other cases, it may be used by STAs operating under PCF, to transmit Beacon Frames with priority. At the nominal beginning of each Contention-Free Period (CFP), where access to the medium is coordinated by the Point Coordinator (PC), the PC may sense the medium. When the medium is determined to be idle for one PIFS period, generally 25 µs, the PC may transmit a Beacon frame containing the Contention-Free (CF) Parameter Set element and a delivery traffic indication message element. The CF parameter set may carry parameters that may be needed to support PCF operation. A delivery traffic indication map may be understood as a traffic indication map which may inform the STAs about the presence of buffered multicast/broadcast data on the AP.

Load-based Clear Channel Assessment in Europe Regulation EN 301.893

For a device not utilizing the Wi-Fi protocol, EN 301.893, v. 1.7.1 provides the following requirements and minimum behavior for the load-based clear channel assessment. An example to illustrate the EN 301.893 is provided in FIG. 6.

1) Before a transmission or a burst of transmissions on an Operating Channel, the equipment may perform a Clear Channel Assessment (CCA) check using "energy detect", as represented in the Figure by a circled "1". The equipment may observe the Operating Channel(s) for the duration of the CCA observation time, which may be not less than 20 µs. The CCA observation time used by the equipment may be declared by the manufacturer. The Operating Channel may be considered occupied if the energy level in the channel exceeds the threshold corresponding to the power level given in point 5 below. If the equipment finds the channel to be clear", as represented in the Figure by a circled "1", it may transmit immediately,", as represented in the Figure by a circled "2", see point 3 below.

2) If the equipment finds an Operating Channel occupied, it may not transmit in that channel. The equipment may perform an Extended CCA check", as represented in the Figure by a circled "3", in which the Operating Channel is observed for the duration of a random factor N multiplied by the CCA observation time. N defines the number of clear idle slots resulting in a total Idle Period that may need to be observed before initiation of the transmission. The value of N may be randomly selected in the range 1 . . . q every time an Extended CCA may be required, and the value stored in a counter. The value of q is selected by the manufacturer in the range 4 . . . 32. This selected value may be declared by the manufacturer, see clause 5.3.1 q. The counter may be decremented every time a CCA slot is considered to be "unoccupied". When the counter reaches zero, the equipment may transmit", as represented in the Figure by a circled "2", on the right side.

The equipment may be allowed to continue Short Control Signalling Transmissions on this channel providing it complies with the requirements in clause 4.9.2.3.

For equipment having simultaneous transmissions on multiple, adjacent or non-adjacent, operating channels, the equipment may be allowed to continue transmissions on other Operating Channels, providing the CCA check did not detect any signals on those channels.

3) The total time that an equipment makes use of an Operating Channel is the Maximum Channel Occupancy Time which may be less than ($13/32$)×q ms, with q as defined in point 2 above, after which the device may perform the Extended CCA described in point 2 above.

4) The equipment, upon correct reception of a packet which was intended for this equipment, may skip CCA and immediately, see note 4 below, proceed with the transmission of management and control frames (Ctrl), e.g. ACK and Block ACK frames", as represented in the Figure by a circled "4". A consecutive sequence of transmissions by the equipment, without it performing a new CCA, may not exceed the Maximum Channel Occupancy Time as defined in point 3 above.

NOTE: For the purpose of multi-cast, the ACK transmissions, associated with the same data packet, of the individual devices are allowed to take place in a sequence 5) The energy detection threshold for the CCA may be proportional to the maximum transmit power (PH) of the transmitter: for a 23 decibel-milliwatts (dBm) Effective Isotropic Radiated Power (e.i.r.p.) transmitter, the CCA threshold level (TL) may be equal or lower than −73 dBm/MHz at the input to the receiver, assuming a 0 decibel isotropic (dBi) receive antenna. For other transmit power levels, the CCA Threshold Level (TL) may be calculated using the formula: TL=−73 dBm/MHz+23−PH, assuming a 0 dBi receive antenna and PH specified in dBm e.i.r.p.

Licensed Assisted Access (LAA) to Unlicensed Spectrum Using LTE

Up to now, the spectrum used by LTE is dedicated to LTE. This has the advantage that an LTE system may not need to care about coexistence with other non-3GPP radio access technologies in the same spectrum and spectrum efficiency may be maximized. However, the spectrum allocated to LTE is limited, which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum, as shown in FIG. 7, a UE may be connected to a PCell in the licensed band and one or more SCells in the unlicensed band. In this application a secondary cell in unlicensed spectrum may be denoted as LAA secondary cell (LAA SCell). The LAA SCell may operate in DL-only mode or operate with both UL and DL traffic. Furthermore, in future scenarios, the LTE nodes may operate in standalone mode in license-exempt channels without assistance from a licensed cell. Unlicensed spectrum may, by definition, be simultaneously used by multiple different technologies. Therefore, LAA as described above may need to consider coexistence with other systems such as IEEE 802.11 (W-Fi).

To coexist fairly with the Wi-Fi system, transmission on the SCell may conform to LBT protocols in order to avoid collisions and causing severe interference to on-going transmissions. This may include both performing LBT before commencing transmissions, and limiting the maximum duration of a single transmission burst. The maximum transmission burst duration may be specified by country and region-specific regulations, for e.g., 4 ms in Japan and 13 ms in Europe according to EN 301.893. An example in the context of LAA is shown in FIG. 8, with different examples for the duration of a transmission burst on the LAA SCell constrained by a maximum allowed transmission duration of 4 ms. FIG. 8 is a schematic diagram illustrating LAA to unlicensed spectrum using LTE carrier aggregation and listen-before-talk to ensure good coexistence with other unlicensed band technologies. In FIG. 8, the transmitted bursts are represented with black rectangles. Each rectangle represents a subframe. Note that before every transmitted burst in the SCell, a listening period is performed, as indicated by the striped areas. Bursts of 4 ms, 3 ms and 8 ms are represented in the Figures, as examples. Because in the example of FIG. 7, the maximum allowed transmission duration of 4 ms, the 8 ms burst is interrupted by a listening period after the first 4 ms of the burst.

Existing methods for LAA LTE to support LBT in unlicensed spectrum may comprise inappropriate delays of transmission, as well as interference problems, that result in poor performance of a wireless communications network.

SUMMARY

It is therefore an object of embodiments herein to improve the performance of a wireless communications network by providing improved methods of scheduling transmissions in a wireless communications network. It is a further object of embodiments herein to improve the performance of a wireless communications network by providing improved methods of performing LBT in a wireless communications network.

According to a first aspect of embodiments herein, the object is achieved by a method performed by a network node. The method is for scheduling one or more bearers for transmission to or from a wireless device. The wireless device is serviced by the network node. The network node calculates a weight for each bearer of the one or more bearers established between the network node and the wireless device. The calculating is based on an indication of a quality of service associated with information to be transmitted in each bearer of the one or more bearers. The network node schedules the one or more bearers for transmission to or from the wireless device based on the calculated weight. The calculated weight corresponds to an LBT setting. The LBT setting comprises an LBT algorithm and its corresponding one or more parameters.

According to a second aspect of embodiments herein, the object is achieved by a method performed by the wireless device serviced by the network node. The method is for applying an LBT setting. The wireless device receives, from the network node, an indication of the LBT setting. The LBT setting corresponds to the weight to be applied by the wireless device when performing an LBT. The LBT setting comprises the LBT algorithm and its corresponding one or more parameters. The wireless device applies the LBT setting of the received indication when performing the LBT. The weight is for each bearer of one or more bearers established between the network node and the wireless device. The weight is based on the indication of the quality of service associated with information to be transmitted in each bearer of the one or more bearers.

According to a third aspect of embodiments herein, the object is achieved by a network node configured to schedule one or more bearers for transmission to or from the wireless device. The network node is configured to service the wireless device. The network node is further configured to calculate the weight for each bearer of the one or more bearers configured to be established between the network node and the wireless device. To calculate is configured to be based on the indication of the quality of service associated with information configured to be transmitted in each bearer of the one or more bearers. The network node is configured to schedule the one or more bearers for transmission to or from the wireless device based on the calculated weight. The calculated weight corresponds to the LBT setting. The LBT setting comprises the LBT algorithm and its corresponding one or more parameters.

According to a fourth aspect of embodiments herein, the object is achieved by a wireless device configured to apply the LBT setting. The wireless device is configured to be serviced by the network node. The wireless device is further configured to receive, from the network node, the indication of the LBT setting. The LBT setting corresponds to the weight to be applied by the wireless device when performing the LBT. The LBT setting comprises the LBT algorithm and its corresponding one or more parameters. The wireless device is further configured to apply the LBT setting when performing LBT. The weight is for each bearer of one or more bearers configured to be established between the network node and the wireless device. The weight is based on the indication of the quality of service associated with information configured to be transmitted in each bearer of the one or more bearers.

According to a fifth aspect of embodiments herein, the object is achieved by a computer program, comprising instructions which, when executed on at least one processor, cause the at least one processor to carry out the method performed by the network node.

According to a sixth aspect of embodiments herein, the object is achieved by a computer-readable storage medium, having stored thereon the computer program, comprising instructions which, when executed on at least one processor, cause the at least one processor to carry out the method performed by the network node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the network node calculating the weight for each bearer based on quality of service, the weight corresponding to an LBT setting, and scheduling the one or more bearers for transmission based on the calculated weight, the network node enables the prioritization of traffic of certain bearers during LBT, based on their associated QoS. Traffic may be then be prioritized when performing LBT by choosing the LBT algorithm and parameters, e.g., shorter initial CCA sensing time, shorter extended CCA sensing time, etc. . . . which are mapped to the calculated weight. This leads to better and fairer sharing of the unlicensed spectrum with other technologies such as Wi-Fi, by performing LBT, while at the same time enabling the prioritization of information to be transmitted.

BRIEF DESCRIPTION OF THE DRAWINGS

Examples of embodiments herein are described in more detail with reference to the accompanying drawings, in which.

DETAILED DESCRIPTION

Terminologies

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node (e.g. MSC, MME etc.), O&M, OSS, SON, positioning node (e.g. E-SMLC), MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also apply to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

There is currently no specification for LAA LTE to support LBT with prioritized QoS in unlicensed spectrum.

Figure 1:
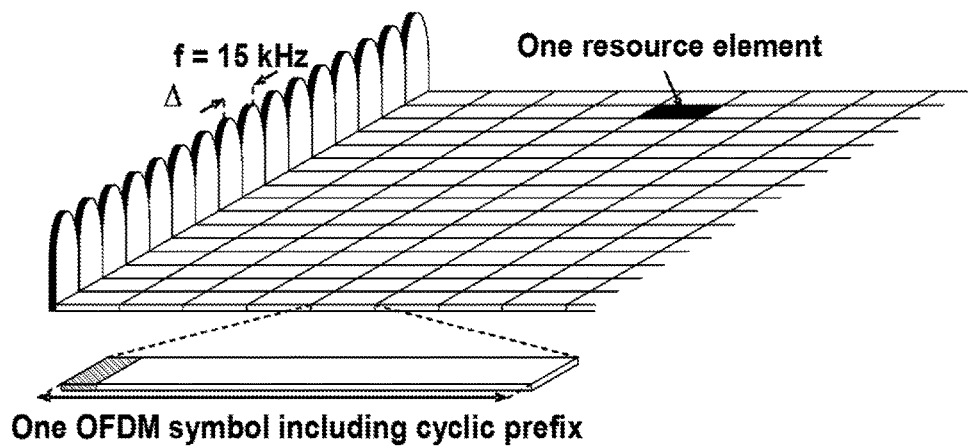
FIG. 1 is a schematic illustration of the LTE downlink physical resource, according to existing methods.
Figure 2:
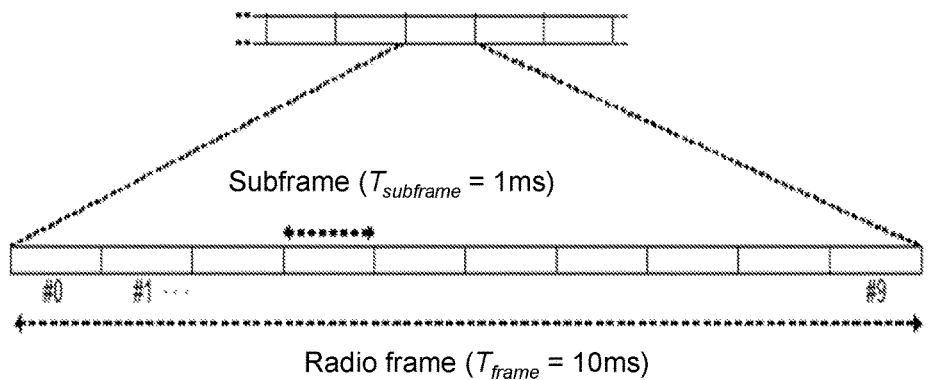
FIG. 2 is a schematic illustration of an LTE time-domain structure, according to existing methods.
Figure 3:
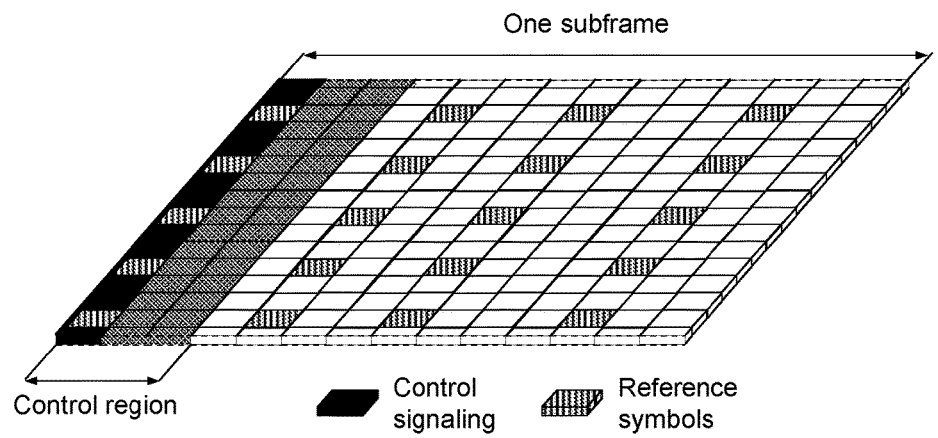
FIG. 3 is a schematic illustration of a normal downlink subframe, according to existing methods.
Figure 4:
FIG. 4 is a schematic illustration of carrier aggregation, according to existing methods.
Figure 5:
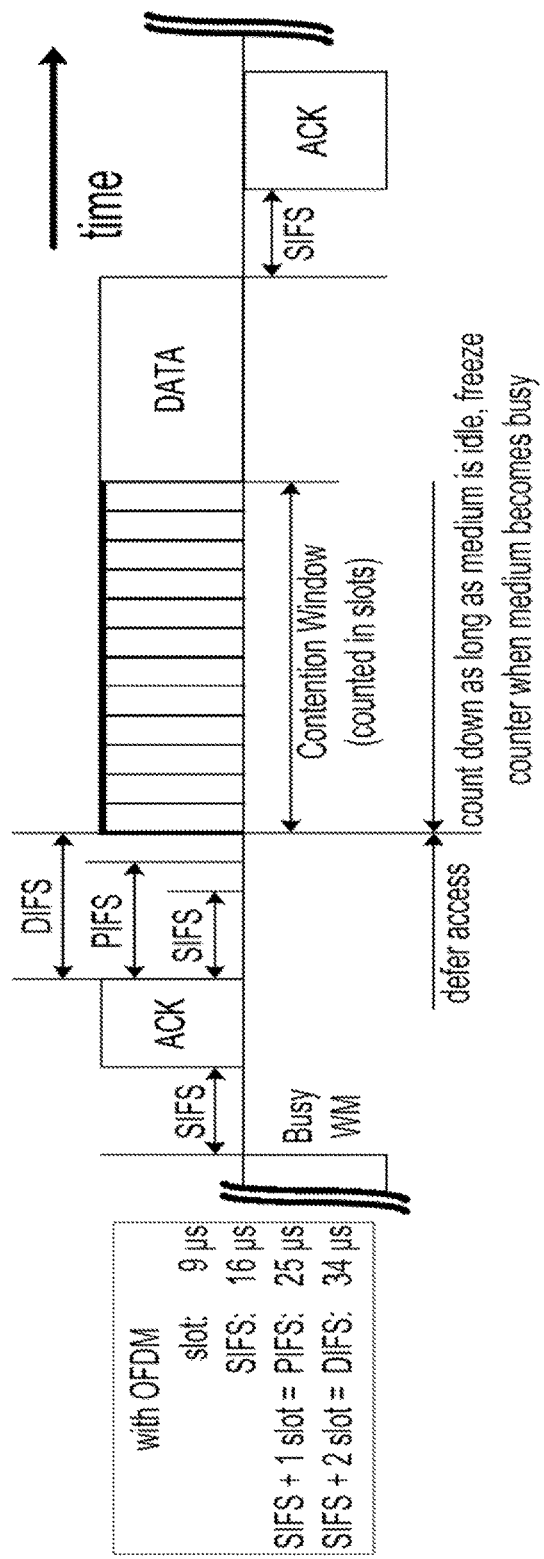
FIG. 5 is a schematic illustration of the LBT mechanism in Wi-Fi, according to existing methods.
Figure 6:
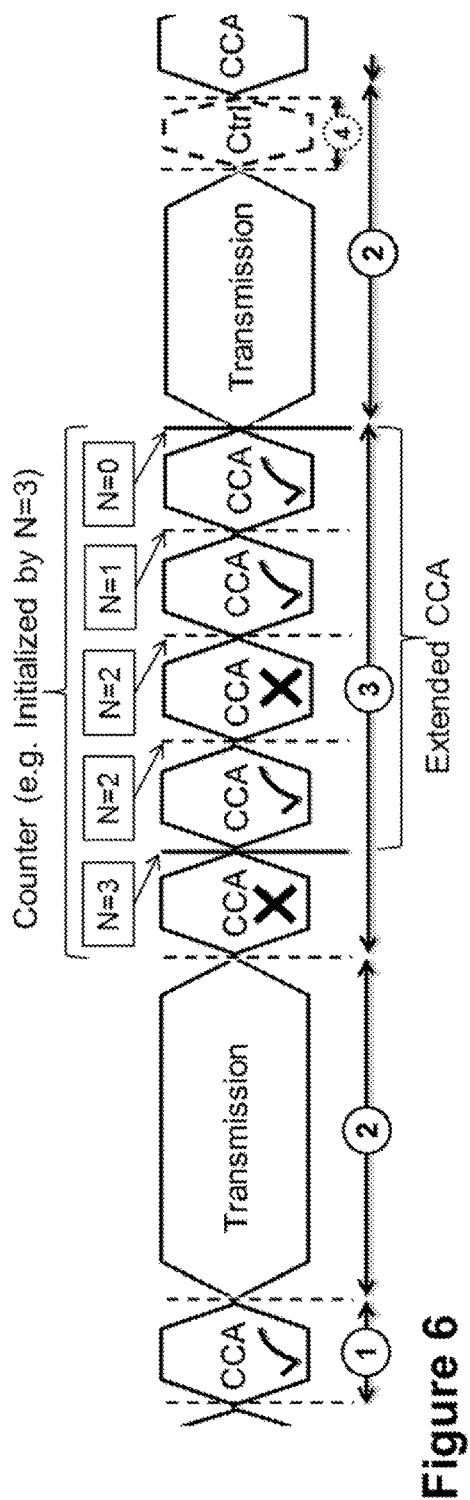
FIG. 6 is a schematic illustration of LBT in EN 301.893, according to existing methods.
Figure 7:
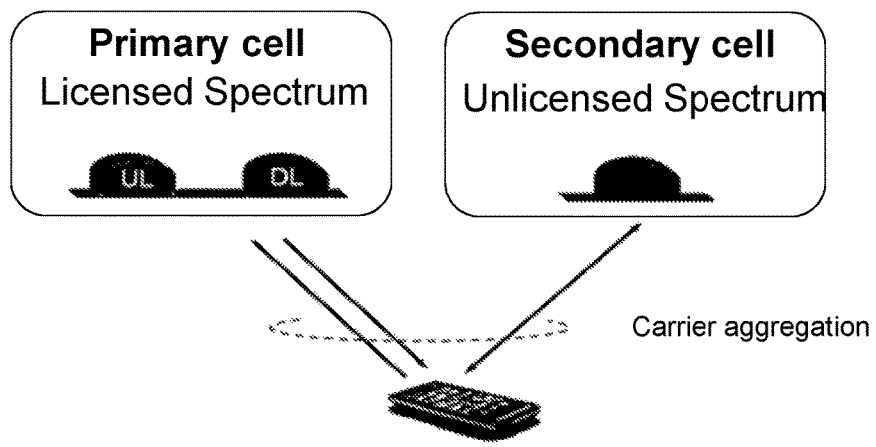
FIG. 7 illustrates a CA-capable UE configured with one LAA SCell, according to existing methods.
Figure 8:
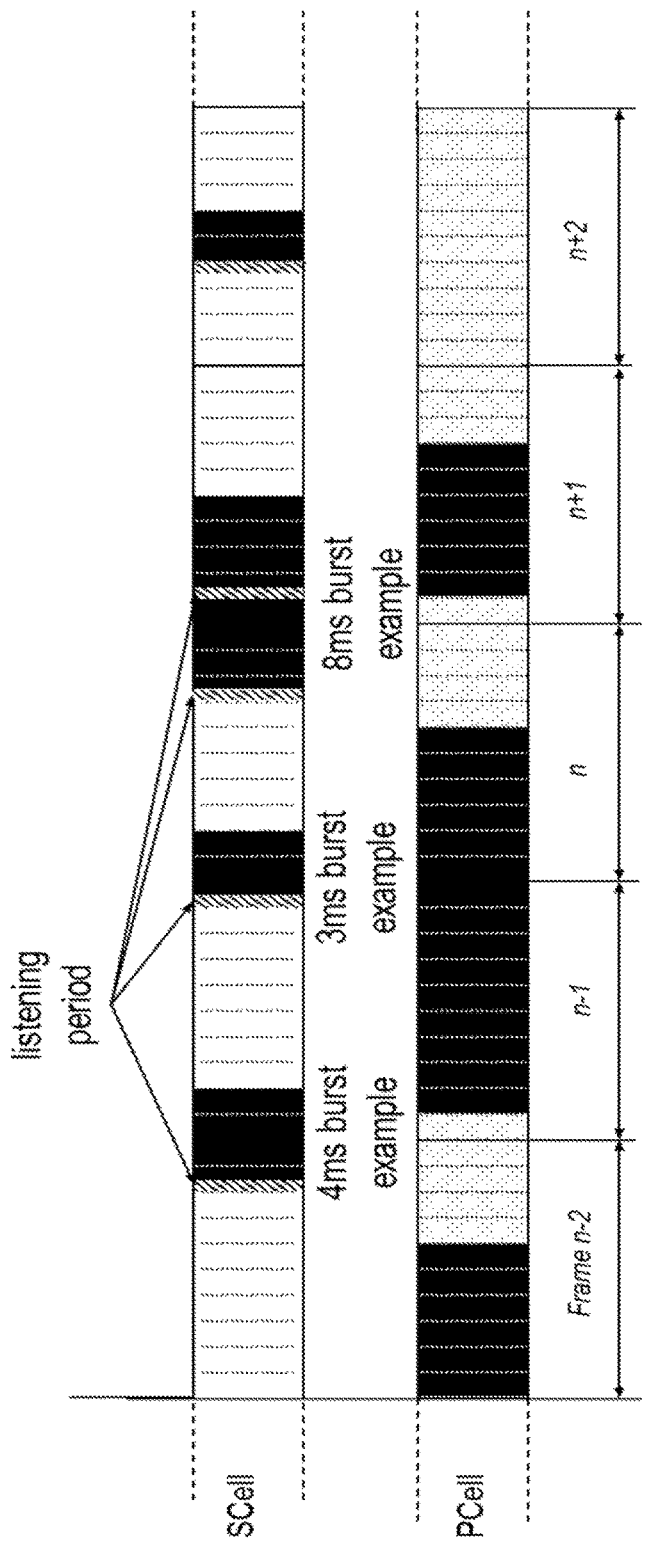
FIG. 8 is a schematic illustration of LAA to unlicensed spectrum using LTE CA and LBT, according to existing methods.
Figure 9:
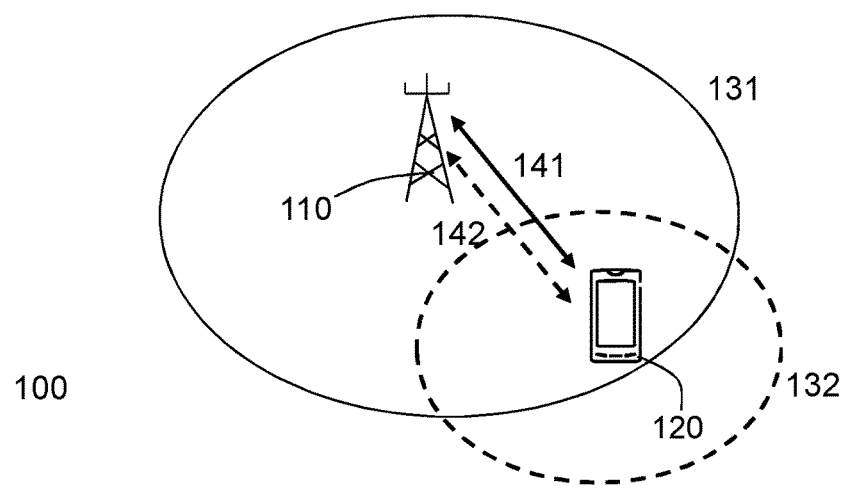
FIG. 9 is a schematic diagram depicting a wireless communications network, according to embodiments herein.

FIG. 9 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes whereof the network node 110 is depicted in FIG. 9. The network node 110 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 9, the network node 110 serves a first cell 131 or primary cell 131. The primary cell 131 is typically in licensed spectrum. The network node 110 also serves a second cell 132, licensed-assisted access cell 132, also referred to herein as licensed-assisted access secondary cell 132, as defined above. The licensed-assisted access cell 132 is in unlicensed spectrum. The primary cell 131 and the licensed-assisted access cell 132 are used for communication between the network node 110 and wireless device 120. The network node 100 may be of different classes, such as, e.g., macro eNodeB, home eNodeB or pico base station, based on transmission power and thereby also cell size. Typically, wireless communications network 100 may comprise more cells similar to the first cell 131 and the second cell 132, served by their respective network node. This is not depicted in FIG. 9 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

The wireless device 120 also referred to herein as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

The wireless devices 120 is configured to communicate within the wireless communications network 100 with the network node 110 over a first radio link 141 in the primary cell 131, and over a second radio link 142 in the licensed-assisted access cell 132.

Any of the network node 110 and the wireless device 120 may be referred to herein as a first node. Any of the network node 110 and the wireless device 120 may be referred to herein as a second node. Also, any reference herein to a UE is understood to apply to a wireless devices such as the wireless device 120. Likewise, any reference herein to a eNB is understood to apply to a network node such as the network node 110.

Embodiments of a method performed by the network node 110 for scheduling one or more bearers for transmission to or from the wireless device 120, will now be described with reference to the flowchart depicted depicted in FIG. 10. The network node 110 operates in the wireless communications network 100. The wireless device 120 is serviced by the network node 110.

The method may comprise the following actions, which actions may as well be carried out in another suitable order than that described below. In FIG. 10, optional actions are indicated with dashed boxes.

Action 1001

The network node 110 may want to prioritize traffic in certain bearers during LBT, based on their associated QoS. Traffic may be prioritized in LBT by choosing the LBT algorithm and parameters, e.g., shorter initial CCA sensing time, shorter extended CCA sensing time, etc. . . . . In order to enable performance of the LBT process, either in the UL or in the DL, taking into consideration the QoS associated with the traffic, in this Action, the network node 110 calculates a weight, e.g., w, for each bearer of one or more bearers established between the network node 110 and the wireless device 120. The calculating 1001 is based on an indication of a quality of service associated with information to be transmitted in each bearer of the one or more bearers. For example, the indication of quality of service may be a QCI. The calculated weight corresponds to an LBT setting. That is, the calculated weight may map, to the LBT setting. The LBT setting comprises an LBT algorithm and its corresponding one or more parameters. The alternatives for the LBT algorithms may be only one alternative, or two or more, where each alternative may have its corresponding set of parameters. However, different weights may correspond to different initializations of the parameters, even though they may belong to the same alternative for the LBT algorithm. Examples of the one or more parameters are the initial CCA sensing time, extended CCA (eCCA) sensing time and range of random backoff number for eCCA, etc. . . .

Calculating a weight corresponding to an LBT setting may offer better control of the final LBT setting, such as, for example, when multiple bearers are present in the same subframe, and one LBT setting is to be used for the channel contention process, as will be discussed later.

The indication of quality of service may be one of: a quality of service determined by the network node 110 and a quality of service reported by the wireless device 120, that is, e.g., sent by the wireless device 120 to the network node 110.

Note that the weight w may be a range of values where different weights correspond to non-overlapping ranges of values. One example of mapping is illustrated in Table 2, where an index is used to address each weight. For example, consider that there is only one alternative for the LBT algorithm such as the load based algorithm described in section "Load-based clear channel assessment in Europe regulation EN 301.893", where for simplicity it may be referred to as Alg1. Then, $A_1=A_2=\ldots=A_m=$Alg1 may be found in the second column of Table 2. Moreover, the LBT parameters corresponding to Alg1 may be, for example, initial CCA sensing time, eCCA sensing time and random number range for eCC, that are included in each set $P_i, i=1,\ldots,m$. However, the initializations for each set may be different for different weights. The mapping table corresponding to this example is shown in Table 3. Table 3 shows an example of mapping weight when one LBT algorithm is available (Alg1), which is the LBT load-based algorithm in section "Load-based clear channel assessment in Europe regulation EN 301.893" for LAA, where $A_1=A_2=\ldots=A_m=$Alg1 and $P_i=\{T_{0i}, T_{1i}, [X_i, Y_i]\}$, $i=1,\ldots,m$.

TABLE 2

Table of mapping weights to LBT algorithm and parameters

| Weight | LBT algorithm | LBT algorithm parameters |
|---|---|---|
| $w_1$ | $A_1$ | $P_1$ |
| $w_2$ | $A_2$ | $P_2$ |
| ... | ... | ... |
| $w_m$ | $A_m$ | $P_m$ |

TABLE 3

| Weight | LBT algorithm | LBT algorithm parameters | | |
|---|---|---|---|---|
| | | Initial CCA sensing time | eCCA sensing time | Random number range for eCCA |
| $w_1$ | Alg1 | $T_{01}$ | $T_{10}$ | $[X_1, Y_1]$ |
| $w_2$ | Alg1 | $T_{02}$ | $T_{12}$ | $[X_2, Y_2]$ |
| ... | ... | ... | ... | ... |
| $w_m$ | Alg1 | $T_{0m}$ | $T_{1m}$ | $[X_m, Y_m]$ |

In an aspect of this example, physical and Medium Access Control (MAC) layer control messages that may not normally be associated with a bearer may also be given a pseudo-QCI so that the LBT procedure may accommodate the transmission of such messages into the prioritization scheme. In an exemplary version of this example, such messages may be given a QCI of 0 with a priority of 0, i.e., higher than any other type of services. In another variation of the example, different control messages may have different priorities.

Action 1002

In some embodiments, wherein the one or more bearers comprise at least two or more bearers, the two or more bearers are scheduled for transmission on a same subframe, and wherein the weight of each of the two or more bearers is different so that there are weights of the two or more bearers, the network node 110 may need to choose one LBT setting that applies to the subframe. Thus, in this Action, the network node 110 may select the LBT setting for transmission of the same subframe. That is, The selection of the LBT setting may be based on one of: a) an average priority bearer weight of the weights of the two or more bearers, and b) a weighted average priority bearer weight of the weights of the two or more bearers. Alternatively, the selection of the LBT setting may be based on a highest priority bearer weight of the weights of the two or more bearers.

LBT with QoS for LAA with Multiple Bearers

In a particular embodiment, if several bearers of a wireless device, such as the wireless device 120, are scheduled to be transmitted on subframe n on a LAA cell in unlicensed spectrum for transmission in DL or UL, and the weight for one or more of the bearers are different, the LBT setting may be selected, according to Action 1002, based on the highest priority bearer weight for the wireless device 120. In another variation of this embodiment, the LBT setting may be selected based on the averaged bearer weight of the wireless device 120. In a further variation of this embodiment, the LBT setting may be selected based on a weighted average of all scheduled bearers of the wireless device 120, i.e., $W=a_1 \cdot w_1 + a_2 \cdot w_2 + \ldots + a_k \cdot w_k$, where k is the number of distinct valid weights for all scheduled bearers and $1=a_1+a_2+\ldots+a_k$. In some cases, the weights may be inversely proportional to the bearer priorities, such that the LBT setting may be selected based on the lowest priority bearer weight.

In this embodiment, if several wireless devices are scheduled on the same subframe n on a LAA cell for transmissions in DL and the bearer weights are different for one or more of the scheduled wireless devices, the LBT setting may be selected based on the weight with highest priority among all bearers of all scheduled wireless devices in the DL on subframe n. In another variation of this embodiment, the weight may be averaged for all bearers belonging to one wireless device 120 and the LBT setting may be selected based on the largest averaged weight among all scheduled wireless devices in the DL on subframe n. In a further variation of this embodiment, the highest weight among the bearers for each scheduled wireless device in the DL on subframe n may be averaged and the LBT setting may be selected based on the averaged weight. In another variation, the weight for all bearers of all scheduled wireless devices in the DL on subframe n may be averaged to obtain the LBT parameter setting. In a further variation of this embodiment, the LBT parameter setting may be chosen based on a weighted average of all the bearer weights for all scheduled wireless devices in the DL on subframe n.

In an aspect of this embodiment, physical and MAC layer control messages that are not normally associated with a bearer, targeted to one or more of wireless devices, may also be given a pseudo-QCI, so that the LBT procedure may accommodate the transmission of such messages into the prioritization scheme. In an exemplary version of this embodiment, such messages may be given a QCI of 0 with a priority of 0, i.e., higher than any other type of services. In another variation of the embodiment, different control messages may have different priorities.

According to the foregoing, in some embodiments, two or more wireless devices may be scheduled for transmission on a same subframe. The weight of each of the one or more bearers for at least two of the two or more wireless devices may be different, so that there may be weights of the two or more bearers of the two or more wireless devices. In such embodiments the method may further comprise selecting the LBT setting for transmission of the same subframe, wherein the selection of the LBT setting is based on one of: a) a highest priority bearer weight of the weights of the two or more bearers of the two or more wireless devices, b) a highest averaged priority bearer weight per wireless device of the two or more wireless devices, of the weights of the two or more bearers, c) an average priority bearer weight of a highest priority bearer weight per wireless device of the two or more wireless devices, and d) an average priority bearer weight of the weights of the two or more bearers of the two or more wireless devices. Alternatively, the selection of the LBT setting is based on a priority bearer weight of the weights of the two or more bearers.

This action is optional.

Action 1003

In this Action, the network node 110 schedules the one or more bearers for transmission to or from the wireless device 120 based on the calculated weight. That is, the network node 110 in this Action may schedule information, e.g., data, from the one or more bearers for transmission. The transmission may be in unlicensed spectrum in one of: a) the Licensed-Assisted Access cell 132 in LTE, and b) standalone LTE.

LBT with QoS for LAA with Multiple Carrier Operation

In a first embodiment for multi carrier operation, all carriers that a device may use that may be about to transmit, may apply LBT with QoS independently per carrier. The LBT with QoS that may be used may, for example, be the ones given in embodiments in sections "LBT with QoS for LAA in the Downlink (DL)", "LBT with QoS for LAA in the Uplink (UL)" and "LBT with QoS for LAA with Multiple Bearers".

In a second embodiment for multi carrier operation, there may be one Master carrier and at least one Slave carrier. The data with higher QCIs may be scheduled to be transmitted on Master carriers and lower priority data may be scheduled on slave carriers. The device that may be about to transmit data may apply the LBT with QoS in accordance with sections "LBT with QoS for LAA in the Downlink (DL)", "LBT with QoS for LAA in the Uplink (UL)" and "LBT with QoS for LAA with Multiple Bearers" on the Master carrier. Once the LBT succeeds on the Master carrier, on slave carriers where the device is supposed to transmit on, the device may transmit the data by checking if the channel is idle for a period of initial CCA duration $T_0$ after data transmission on the Master carrier; otherwise, the device may not use the slave carrier for transmission. A device may either be a UE, eNB or Relay.

According to the foregoing, in some embodiments, the scheduling by the network node 110 according to Action 1003 may comprise a multi-carrier operation, and the LBT may be applied with a quality of service independently for each carrier, that is, independently of one another.

Also according to the foregoing, in some embodiments, the scheduling by the network node 110 according to Action 1003 may comprise a multi-carrier operation, and data associated with a higher indication of quality of service may be scheduled to be transmitted in one or more master carriers, and data associated with a lower indication of quality of service may be scheduled to be transmitted in one or more slave carriers. Transmission in the one or more slave carriers may be only performed after an outcome of a period of observation of a radio channel for transmission is that the radio channel is idle.

Action 1004

In this Action, the network node 110 may itself perform LBT, and the network node 110 itself may therefore apply the LBT setting corresponding to the calculated weight when performing LBT.

This action is optional.

Action 1005

If the wireless device 120 is to perform LBT, in this Action, the network node 110 may send an indication of the LBT setting, corresponding to the calculated weight to the wireless device 120 to be applied by the wireless device 120 when performing LBT. This action may be implemented by sending the indication of the LBT setting in one example, in an UL grant. The indication of the LBT setting may be an index.

This action is optional.

Figure 11:
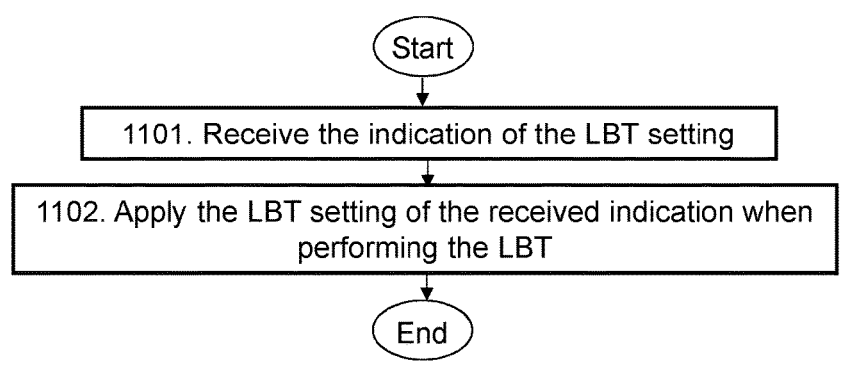
FIG. 11 is a flowchart depicting embodiments of a method in a wireless device, according to embodiments herein.

Embodiments of a method performed by the wireless device 120 serviced by the network node 110 for applying an LBT setting, will now be described with reference to the flowchart depicted in FIG. 11.

The detailed description of some of the following corresponds to the same references provided above, in relation to the actions described for the network node 110, and will thus not be repeated here.

Action 1101

In this action, the wireless device 120 receives, from the network node 110, the indication of the LBT setting corresponding to the weight to be applied by the wireless device 120 when performing an LBT, that is, the weight calculated by the network node 110. As stated earlier, the LBT setting comprises the LBT algorithm and its corresponding one or more parameters. The weight is for each bearer of the one or more bearers established between the network node 110 and the wireless device 120. The weight is based on the indication of the quality of service associated with information to be transmitted in each bearer of the one or more bearers.

In some embodiments, the indication of the LBT setting is an index, and the wireless device 120 may map the index to the LBT setting.

Action 1102

In this action, the wireless device 120 applies the LBT setting of the received indication when performing the LBT.

Embodiments herein may define a QoS framework for LBT when LAA is operating in unlicensed spectrum in order to serve traffic with different priorities.

According to the foregoing, in embodiments herein, for different types of traffic on a LAA cell in unlicensed spectrum, a weight may be calculated based on the QCI of the traffic. The weight may then used to select the LBT settings including LBT algorithm and corresponding parameters, for example the initial CCA sensing time, extended CCA (eCCA) sensing time and range of random backoff number for eCCA, etc for the load-based system as described in section "Load-based clear channel assessment in Europe regulation EN 301.893", to support LBT with prioritized QoS in unlicensed spectrum.

The following advantages of embodiments herein have been identified: LBT with QoS differentiation may be supported in unlicensed spectrum in LTE, which leads to better and fairer sharing of the unlicensed spectrum with other technologies such as Wi-Fi.

In contrast to e.g., U.S. Pat. No. 8,774,209B2, embodiments herein may only focus on the LBT phase of a load-based OFDM system, and are designed to ensure fairer coexistence with other radio access technologies such as Wi-Fi while also satisfying EN 301.893 regulations.

A description of the disclosed methods to support LBT with different QoS requirements for LAA to unlicensed spectrum according to embodiments herein follows with specific examples. The methods in embodiments herein may be applicable to both LAA LTE and standalone LTE operation in license-exempt channels.

Any reference herein to a UE is understood to apply to a wireless device such as the wireless device 120.

Any reference herein to an eNB is understood to apply to a network node such as the network node 110.

LBT with QoS for LAA in the Downlink (DL)

In a first example, and according to Action 1001, in DL, when several bearers to be transmitted to a wireless device, such as the wireless device 120, a weight w may be calculated at the eNB for each bearer, based on the associated QCI and scheduling algorithm, e.g., Proportional Fair or Round-robin scheduling. The weight w may then be input to the scheduler for DL scheduling decision for the bearer to be transmitted to the wireless device 120 according to Action 1003. If the bearer of the wireless device 120 is scheduled to be transmitted from the eNB on subframe n on a LAA cell in unlicensed spectrum, the weight may be mapped to a certain LBT setting including LBT algorithm and its corresponding parameters.

The LBT setting may then be sent to the CCA logic/circuit to be applied when doing LBT for the DL transmission on subframe n, according to Action 1004. This may be done for example by transmitting only the index to the weight.

LBT with QoS for LAA in the Uplink (UL)

In a second example, in UL, for a wireless device, such as the wireless device 120 with data to be transmitted to an eNB, a weight w may be calculated at eNB, according to Action 1001, based on the reported QCIs from the wireless device 120 and scheduling algorithm, e.g., Proportional Fair or Round-robin scheduling. The weight w may then be input to the scheduler for UL scheduling decision for the wireless device 120, according to Action 1003. If the wireless device 120 is scheduled for UL transmission on subframe n on a LAA cell in unlicensed spectrum, the weight may be mapped to a certain LBT setting including LBT algorithm and its corresponding parameters, for example, the initial CCA sensing time, extended CCA sensing time and range of random backoff number for eCCA, etc. for the load-based LBT algorithm, as described in section "Load-based clear channel assessment in Europe regulation EN 301.893". The example mapping in Table 2 for load-based LBT, where the weight is mapped to a set of initial CCA sensing time, eCCA sensing time and the range of the random backoff number for eCCA, may be used for the UL. The LBT setting may then be sent to the wireless device 120 according to Action 1005 and received by the wireless device 120 according to Action 1101, to be applied when doing LBT for the UL transmission on subframe n, according to Action 1102. In one example, LBT setting may be sent to wireless device 120 in UL grant. In another example, an index may be sent to the wireless device 120 in the UL grant by which the wireless device 120 may map the index to the corresponding LBT settings.

In an aspect of this example, physical and MAC layer control messages that may not normally be associated with a bearer may also be given a pseudo-QCI so that the LBT procedure may accommodate the transmission of such messages into the prioritization scheme. In an exemplary version of this example, such messages may be given a QCI of 0 with a priority of 0, i.e., higher than any other type of services. In another variation of the embodiment, different control messages may have different priorities.

Embodiments herein may relate to the L1 and L2 layers.

To perform the method actions described above in relation to FIG. 10, the network node 110 is configured to schedule the one or more bearers for transmission to or from the wireless device 120. The network node 110 comprises the following arrangement depicted in FIG. 12. As already mentioned, the network node 110 is configured to service the wireless device 120. The network node 110 is further configured to operate in the wireless communications network 100.

The detailed description of some of the following corresponds to the same references provided above, in relation to the actions described for the network node 110, and will thus not be repeated here.

The network node 110 is further configured to, e.g., by means of a calculating module 1201 configured to, calculate the weight for each bearer of the one or more bearers configured to be established between the network node 110 and the wireless device 120, to calculate being configured to be based on the indication of the quality of service configured to be transmitted in each bearer of the one or more bearers. The calculated weight corresponds to an LBT setting, the LBT setting comprising an LBT algorithm and its corresponding one or more parameters The calculating module 1201 may be a processor 1207 of the network node 110.

The indication of quality of service may be one of: the quality of service configured to be determined by the network node 110 and the quality of service configured to be reported by the wireless device 120.

The network node 110 is further configured to, e.g., by means of a scheduling module 1202 configured to, schedule the one or more bearers for transmission to or from the wireless device 120 based on the calculated weight.

The scheduling module 1202 may be the processor 1207 of the network node 110.

The transmission may be in unlicensed spectrum in one of: a) the Licensed-Assisted Access cell 132 in LTE and b) standalone LTE.

In some embodiments, to schedule may comprise a multi-carrier operation, and the LBT may be configured to be applied with a quality of service independently for each carrier.

In some embodiments, to schedule may comprise a multi-carrier operation, and data associated with a higher indication of quality of service may be scheduled to be transmitted in one or more master carriers, and data associated with a lower indication of quality of service may be scheduled to be transmitted in one or more slave carriers, wherein transmission in the one or more slave carriers may be configured to only be performed after the outcome of a period of observation of the radio channel for transmission is that the radio channel is idle.

The network node 110 may be further configured to, e.g., by means of an applying module 1203 configured to, apply the LBT setting corresponding to the calculated weight when performing LBT.

The applying module 1203 may be the processor 1207 of the network node 110.

The network node 110 may be further configured to, e.g., by means of a sending module 1204 configured to, send the indication of the LBT setting, corresponding to the calculated weight, to the wireless device 120, to be applied by the wireless device 120 when performing LBT.

The sending module 1204 may be the processor 1207 of the network node 110.

In some embodiments, the one or more bearers may comprise two or more bearers, and the two or more bearers may be configured to be scheduled for transmission on the same subframe, and the weight of each of the two or more bearers may be different, so that there may be weights of the two or more bearers. In such embodiments, the network node 110 may be further configured to, e.g., by means of a selecting module 1205 configured to, select the LBT setting for transmission of the same subframe, wherein the selection of the LBT setting is based on one of: a. the average priority bearer weight of the weights of the two or more bearers; and b. the weighted average priority bearer weight of the weights of the two or more bearers.

The selecting module 1205 may be the processor 1207 of the network node 110.

In some other embodiments wherein the one or more bearers comprise two or more bearers, and the two or more bearers are configured to be scheduled for transmission on a same subframe, and wherein the weight of each of the two or more bearers is different so that there are weights of the two or more bearers, the network node 110 may be further configured to, e.g., by means of the selecting module 1205 configured to, select the LBT setting for transmission of the same subframe, wherein the selection of the LBT setting is based on a highest priority bearer weight of the weights of the two or more bearers.

In some embodiments, wherein two or more wireless devices are scheduled for transmission on a same subframe, and wherein the weight of each of the one or more bearers for at least two of the two or more wireless devices is different so that there are weights of the two or more bearers of the two or more wireless devices, the network node 110 may be further configured to, e.g., by means of the selecting module 1205 configured to, select the LBT setting for transmission of the same subframe, wherein the selection of the LBT setting is based on one of:

a. a highest priority bearer weight of the weights of the two or more bearers of the two or more wireless devices;

b. a highest averaged priority bearer weight per wireless device of the two or more wireless devices, of the weights of the two or more bearers;

c. an average priority bearer weight of a highest priority bearer weight per wireless device of the two or more wireless devices; and d. an average priority bearer weight of the weights of the two or more bearers of the two or more wireless devices.

In some other embodiments wherein two or more wireless devices are scheduled for transmission on the same subframe, and wherein the weight of each of the one or more bearers for at least two of the two or more wireless devices is different so that there are weights of the two or more bearers of the two or more wireless devices may be further configured to, e.g., by means of the selecting module 1205 configured to, select the LBT setting for transmission of the same subframe, wherein the selection of the LBT setting is based on a priority bearer weight of the weights of the two or more bearers.

Figure 12:
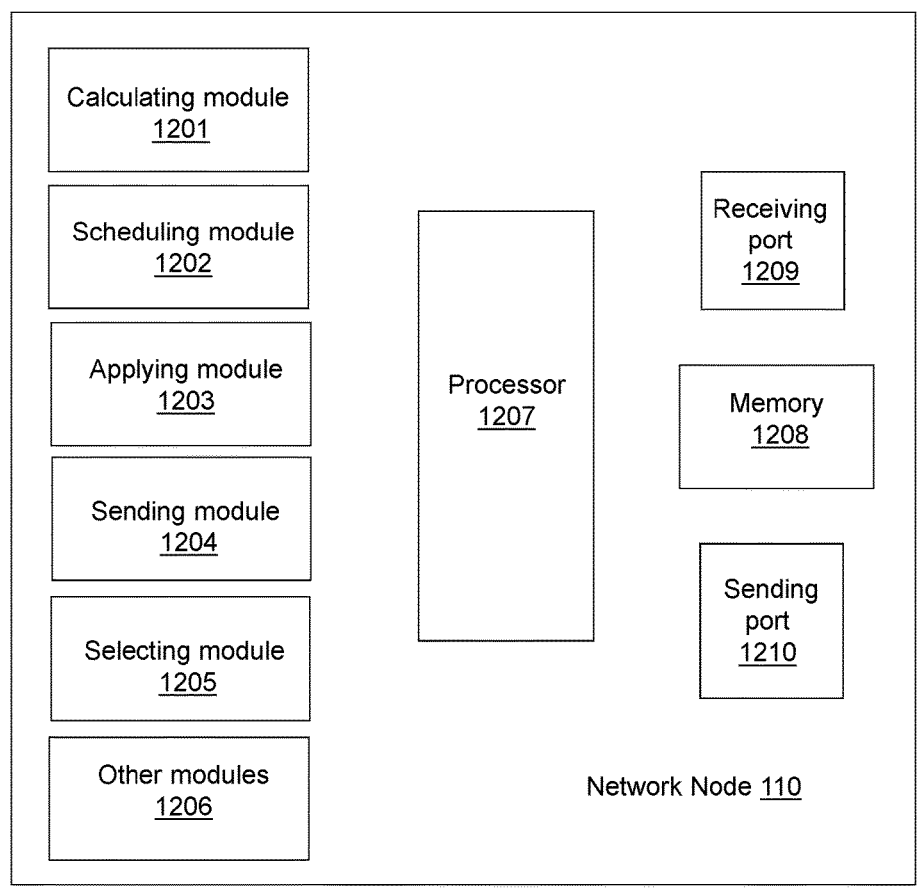
FIG. 12 is a schematic block diagram illustrating embodiments of a network node, according to embodiments herein.

The embodiments herein may be implemented through one or more processors, such as the processor 1207 in the network node 110 depicted in FIG. 12, together with computer program code for performing the functions and actions of the embodiments herein. That is, it will be understood that any reference herein to the processor 1207 may be understood as a processing circuitry comprising one or more processors. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1208, comprising one or more memory units. The memory 1208 is arranged to be used to store obtained information, store data, configurations, schedulings, and applications etc. to perform the methods herein when being executed in the network node 110.

The network node 110 may comprise an interface unit to facilitate communications between the network node 110 and other nodes or devices, e.g., the wireless device 120. The interface may, for example, include a transceiver configured to transmit and receive radio signals over an air interface in accordance with a suitable standard.

In some embodiments, the network node 110 may receive information from the wireless device 120, through a receiving port 1209. In some embodiments, the receiving port 1209 may be, for example, connected to one or more antennas in the network node 110. In other embodiments, the network node 110 may receive information from another structure in the wireless communications network 100 through the receiving port 1209. Since the receiving port 1209 may be in communication with the processor 1207, the receiving port 1209 may then send the received information to the processor 1207. The receiving port 1209 may also be configured to receive other information.

The processor 1207 in the network node 110 may be further configured to transmit or send information to e.g., the wireless device 120, through a sending port 1210, which may be in communication with the processor 1207, and the memory 1208.

Those skilled in the art will also appreciate that the calculating module 1201, the scheduling module 1202, the applying module 1203, the sending module 1204, the selecting module 1205, and the other modules 1206 described above may refer to a combination of analog and digital modules, and/or one or more processors configured with software and/or firmware, e.g., stored in memory, that, when executed by the one or more processors such as the processor 1207, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1201-1206 described above may be implemented as one or more applications running on one or more processors such as the processor 1207.

Thus, the methods according to the embodiments described herein for the network node 110 may be implemented by means of a computer program product, comprising instructions, i.e., software code portions, which, when executed on at least one processor, cause the at least one processor to carry out the actions described herein, as performed by the network node 110. The computer program product may be stored on a computer-readable storage medium. The computer-readable storage medium, having stored thereon the computer program, may comprise instructions which, when executed on at least one processor, cause the at least one processor to carry out the actions described herein, as performed by network node 110. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

To perform the method actions described above in relation to FIG. 11, the wireless device 120 is configured to apply the LBT setting. The wireless device 120 comprises the following arrangement depicted in FIG. 13. As already mentioned, the wireless device 120 is configured to be serviced by the network node 110. The wireless device 120 is further configured to operate in the wireless communications network 100.

The detailed description of some of the following corresponds to the same references provided above, in relation to the actions described for the wireless device 120, and will thus not be repeated here.

The wireless device 120 is further configured to, e.g., by means of a receiving module 1301 configured to, receive, from the network node 110, the indication of the LBT setting corresponding to the weight to be applied by the wireless device 120 when performing an LBT, wherein the LBT setting comprises an LBT algorithm and its corresponding one or more parameters.

The receiving module 1301 may be a processor 1304 of the wireless device 120.

The wireless device 120 is further configured to, e.g., by means of an applying module 1302 configured to, apply the LBT setting of the received indication when performing the LBT, wherein the weight is for each bearer of one or more bearers configured to be established between the network node 110 and the wireless device 120. The weight is based on an indication of a quality of service associated with information configured to be transmitted in each bearer of the one or more bearers.

The applying module 1302 may be the processor 1304 of the wireless device 120.

The transmission may be in unlicensed spectrum in one of: a) the Licensed-Assisted Access cell 132 in Long Term Evolution, LTE, and b) standalone LTE.

In some embodiments, the indication of the LBT setting may be an index, and the wireless device 120 may be further configured to map the index to the LBT setting.

Figure 13:
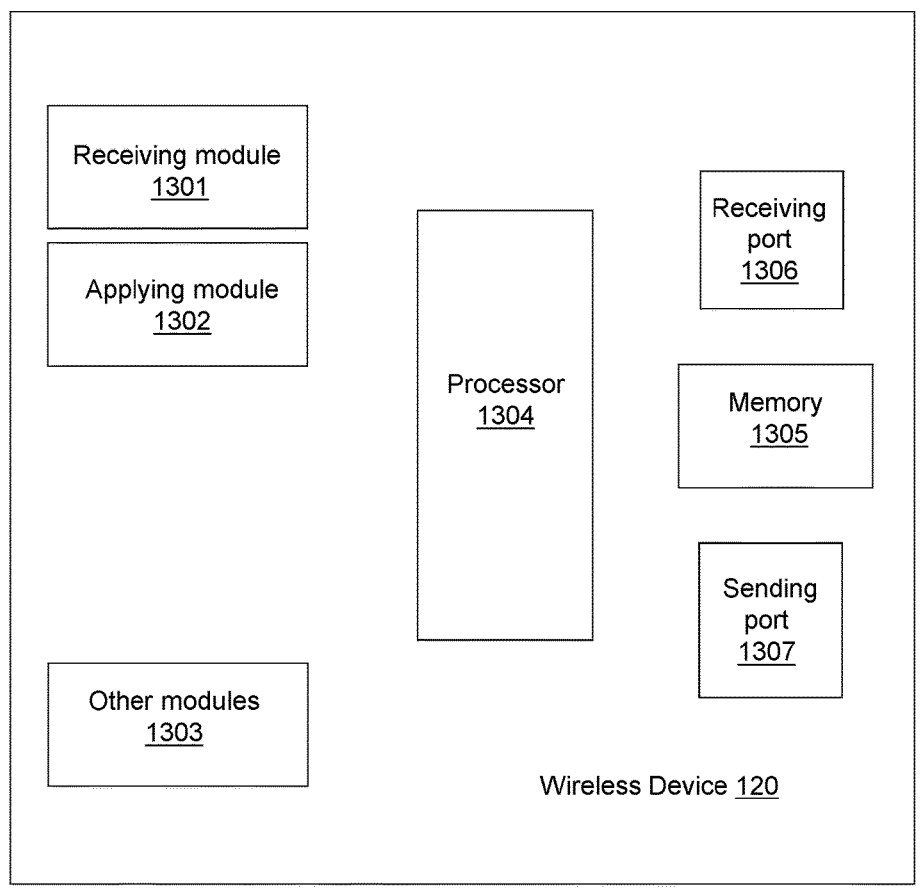
FIG. 13 is a schematic block diagram illustrating embodiments of a wireless device, according to embodiments herein.

The embodiments herein may be implemented through one or more processors, such as the processor 1304 in the wireless device 120 depicted in FIG. 13, together with computer program code for performing the functions and actions of the embodiments herein. That is, it will be understood that any reference herein to the processor 1304 may be understood as a processing circuitry comprising one or more processors. The program code mentioned above may also be provided as a computer program product, for instance in the form of a data carrier carrying computer program code for performing the embodiments herein when being loaded into the in the wireless device 120. One such carrier may be in the form of a CD ROM disc. It is however feasible with other data carriers such as a memory stick. The computer program code may furthermore be provided as pure program code on a server and downloaded to the wireless device 120.

The wireless device 120 may further comprise a memory 1305 comprising one or more memory units. The memory 1305 is arranged to be used to store obtained information, store data, configurations, schedulings, and applications etc. to perform the methods herein when being executed in the wireless device 120.

The wireless device 120 may comprise an interface unit to facilitate communications between the wireless device 120 and other nodes or devices, e.g., the network node 110. The interface may, for example, include a transceiver configured to transmit and receive radio signals over an air interface in accordance with a suitable standard.

In some embodiments, the wireless device 120 may receive information from the network node 110, through a receiving port 1306. In some embodiments, the receiving port 1306 may be, for example, connected to the one or more antennas in the wireless device 120. In other embodiments, the wireless device 120 may receive information from another structure in the wireless communications network 100 through the receiving port 1306. Since the receiving port 1306 may be in communication with the processor 1304, the receiving port 1306 may then send the received information to the processor 1304, respectively. The receiving port 1306 may also be configured to receive other information.

The processor 1304 in the wireless device 120 may be further configured to transmit or send information to e.g., the network node 110, through a sending port 1307, which may be in communication with the processor 1304, and the memory 1305.

Those skilled in the art will also appreciate that the receiving module 1301, the applying module 1302 and the other modules 1303 described above may refer to a combination of analog and digital modules, and/or one or more processors configured with software and/or firmware, e.g., stored in memory, that, when executed by the one or more processors such as the processor 1304, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1303 described above may be implemented as one or more applications running on one or more processors such as the processor 1304.

Thus, the methods according to the embodiments described herein for the wireless device 120 may be implemented by means of a computer program product, comprising instructions, i.e., software code portions, which, when executed on at least one processor, cause the at least one processor to carry out the actions described herein, as performed by the wireless device 120. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 120. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

Examples Related to Embodiments Herein

Several embodiments are comprised herein. More specifically the following are network node and wireless device related embodiments.

Figure 10:
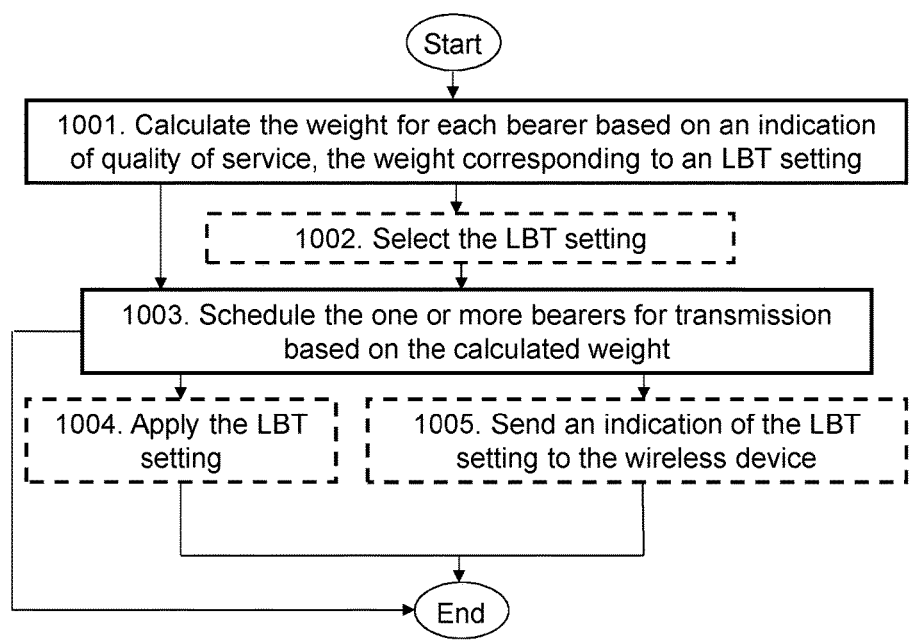
FIG. 10 is a flowchart depicting embodiments of a method in a network node, according to embodiments herein.

The network node embodiments relate to FIGS. 10 and 12. The wireless device embodiments relate to FIGS. 11 and 13.

A method in a network node such as the network node 110 may comprise the actions of:

calculating 1001 a weight for each bearer of one or more bearers established between a first node, such as the network node 110 and a second node, such as the wireless device 120 serviced by the network node 110, the calculating being based on an indication of quality of service. The calculated weight may correspond, that is, may map, to an LBT setting. The LBT setting may comprise an LBT algorithm and its corresponding one or more parameters. The indication of quality of service may be QCI. The indication of quality of service may be one of: a quality of service determined by the network node 110, and a quality of service reported by the second node, such as the wireless device 120. The network node 110 is configured to perform this action 1001, e.g. by means of a calculating module 1201 within the network node 110. The calculating module 1201 may be a processor 1207 of the network node 110, or an application running on such processor;

selecting 1002 the LBT setting for transmission of a time and frequency resource, such as a frame. A frame is used herein as an example of time and frequency resource. In some embodiments, the frame is a same, or frame. In some embodiments, two or more of the one or more bearers may be scheduled for transmission on a same frame, and the weight of each of the two or more bearers may be different so that there are weights of the two or more bearers, and the method may further comprise:

selecting the LBT setting for transmission of the same frame, wherein the selection of the LBT setting is based on one of:

a. a highest priority bearer weight of the weights of the two or more bearers;

b. an average priority bearer weight of the weights of the two or more bearers; and c. a weighted average priority bearer weight of the weights of the two or more bearers.

In some embodiments, two or more wireless devices may be scheduled for transmission on a same frame, and the weight of each of the one or more bearers for at least two of the two or more wireless devices may be different so that there are weights of the two or more bearers of the two or more wireless devices, and the method may further comprise:

selecting the LBT setting for transmission of the same frame, wherein the selection of the LBT setting is based on one of:

a. a highest priority bearer weight of the weights of the two or more bearers of the two or more wireless devices;

b. a highest averaged priority bearer weight per wireless device of the two or more wireless devices, of the weights of the two or more bearers;

c. an average priority bearer weight of a highest priority bearer weight per wireless device of the two or more wireless devices; and d. an average priority bearer weight of the weights of the two or more bearers of the two or more wireless devices.

The network node 110 is configured to perform this action 1002, e.g. by means of a selecting module 1205 within the network node 110. The selecting module 1205 may be a processor 1207 of the network node 110, or an application running on such processor;

scheduling 1003 the one or more bearers for transmission based on the calculated weight, or based on the LBT setting, e.g., the selected LBT setting. Transmission may be to or from the wireless device 120. The transmission may be between the first node and the second node. The transmission may be on the LAA cell 132 in unlicensed spectrum, e.g., on a subframe of such cell. The scheduling may comprise multi-carrier operation, and LBT may be applied with a quality of service, independently for each carrier. The scheduling may comprise multi-carrier operation, and data associated with a higher indication of quality of service may be scheduled to be transmitted in one or more master carriers, and data associated with a lower indication of quality of service may be scheduled to be transmitted in one or more slave carriers, wherein transmission in the one or more slave carriers may only be performed after an outcome of a period of observation, e.g., a CCA, of a radio channel for transmission is that the radio channel is idle, after transmission in the one or more master carriers, of the data associated with the higher indication of quality of service. The network node 110 is configured to perform this action 1003, e.g. by means of a scheduling module 1202 within the network node 110. The scheduling module 1202 may be a processor 1207 of the network node 110, or an application running on such processor;

applying 1004 the LBT setting corresponding to the calculated weight when performing LBT. The LBT may be performed for the transmission on the LAA cell 132 in unlicensed spectrum, e.g., on a subframe of such cell. The network node 110 is configured to perform this action 1004, e.g. by means of an applying module 1203 within the network node 110. The applying module 1203 may be a processor 1207 of the network node 110, or an application running on such processor;

sending 1005 the LBT setting, or an indication of the LBT setting, corresponding to the calculated weight, to the second node or the wireless device 120, to be applied by the second node or the wireless device 120, respectively, when performing LBT. The indication of the LBT setting may be an index, and the wireless device 120 may map the indication to the LBT setting. The network node 110 is configured to perform this action 1005, e.g. by means of a sending module 1205 within the network node 110. The sending module 1204 may be a processor 1207 of the network node 110, or an application running on such processor;

In some embodiments, the order of some or all of the above referenced actions may differ from that described herein. Any reference to the wireless device 120 is understood to equally apply to the second node.

In some embodiments, one or more of the foregoing actions may also be performed by the wireless device 120.

A method in a wireless device such as the wireless device 120 may comprise the actions of:

receiving 1101 the LBT setting, or an indication of the LBT setting, corresponding to the calculated weight, from the network node 110 to be applied by the wireless device 120 when performing LBT. The indication of the LBT setting may be an index, and the wireless device 120 may map the indication to the LBT setting. The wireless device 120 is configured to perform this action 1101, e.g. by means of a receiving module 1301 within the wireless device 120. The receiving module 1301 may be a processor 1304 of the wireless device 120, or an application running on such processor;

applying 1102 the LBT setting when performing LBT, the LBT setting corresponding to the weight calculated by the network node 110, or the received LBT setting from the network node 110. The wireless device 120 is configured to perform this action 1102, e.g. by means of an applying module 1302 within the wireless device 120. The applying module 1102 may be a processor 1304 of the wireless device 120, or an application running on such processor.

In some embodiments, the order of some or all of the above referenced actions may differ from that described herein. Any reference to the wireless device 120 is understood to equally apply to the second node.

Embodiments herein may relate to LBT with QoS for Licensed-Assisted Access to unlicensed spectrum.

The invention claimed is:

1. A method performed by a network node for scheduling a bearer for transmission to or from a wireless device, the wireless device being serviced by the network node, the method comprising:
   calculating a weight for the bearer, based on an indication of a quality of service associated with information to be transmitted in the bearer; and
   scheduling the bearer for transmission to or from the wireless device based on the calculated weight,
   wherein the calculated weight corresponds to a Listen-Before-Talk, LBT, setting, the LBT setting comprising an LBT algorithm and its corresponding one or more parameters, and
   wherein the scheduling comprises a multi-carrier operation, the multi-carrier operation further comprising:
      scheduling data associated with a higher indication of quality of service to be transmitted in one or more master carriers, and
      scheduling data associated with a lower indication of quality of service to be transmitted in one or more slave carriers, transmission in the one or more slave carriers being only performed after an outcome of a period of observation of a radio channel for transmission is that the radio channel is idle.

2. The method of claim 1, wherein the transmission is in unlicensed spectrum in one of:
   a) a Licensed-Assisted Access cell in Long Term Evolution, LTE, and
   b) standalone LTE.

3. The method of claim 1, further comprising:
   applying the LBT setting corresponding to the calculated weight when performing LBT.

4. The method of claim 1, further comprising:
   sending an indication of the LBT setting, corresponding to the calculated weight to the wireless device to be applied by the wireless device when performing LBT.

5. The method of claim 1, wherein the indication of quality of service is one of:
   a quality of service determined by the network node, and
   a quality of service reported by the wireless device.

6. The method of claim 1, wherein when the multi-carrier operation is performed, the LBT is applied with a quality of service independently for each carrier.

7. A method performed by a wireless device serviced by a network node, the method comprising:
   receiving, from the network node, an indication of a Listen-Before-Talk, LBT, setting corresponding to a weight to be applied by the wireless device when performing an LBT, wherein the LBT setting comprises an LBT algorithm and its corresponding one or more parameters; and
   applying the LBT setting of the received indication when performing the LBT,
   wherein the weight is for a bearer established between the network node and the wireless device, and the weight is based on an indication of a quality of service associated with information to be transmitted in the bearer, and
   wherein the applying of the LBT setting of the received indication further comprises:
      transmitting data associated with a higher indication of quality of service in one or more master carriers, and
      transmitting data associated with a lower indication of quality of service in one or more slave carriers, the transmission in the one or more slave carriers being only performed after an outcome of a period of observation of a radio channel for transmission is that the radio channel is idle.

8. A network node configured to:
   schedule a bearer for transmission to or from a wireless device, and
   service the wireless device,
   wherein in scheduling the bearer, the network node is further configured to:
      calculate a weight for the bearer, based on an indication of a quality of service associated with information to be transmitted in the bearer; and
      schedule the bearer for transmission to or from the wireless device based on the calculated weight,
      wherein the calculated weight corresponds to a Listen-Before-Talk, LBT, setting, the LBT setting comprising an LBT algorithm and its corresponding one or more parameters, and
   wherein in scheduling the bearer, the network node is further configured to perform a multi-carrier operation comprising:
      scheduling data associated with a higher indication of quality of service to be transmitted in one or more master carriers, and
      scheduling data associated with a lower indication of quality of service to be transmitted in one or more slave carriers, transmission in the one or more slave carriers being only performed after an outcome of a period of observation of a radio channel for transmission is that the radio channel is idle.

9. The network node of claim 8, wherein the transmission is in unlicensed spectrum in one of:
   a) a Licensed-Assisted Access cell in Long Term Evolution, LTE, and
   b) standalone LTE.

10. The network node of claim 8, being further configured to:
   apply the LBT setting corresponding to the calculated weight when performing LBT.

11. The network node of claim 8, being further configured to:

send an indication of the LBT setting, corresponding to the calculated weight, to the wireless device to be applied by the wireless device when performing LBT.

12. The network node of claim 8, wherein the indication of quality of service is one of:
   a quality of service configured to be determined by the network node, and
   a quality of service configured to be reported by the wireless device.

13. The network node of claim 8, wherein when the multi-carrier operation is performed, the LBT is configured to be applied with a quality of service independently for each carrier.

14. A wireless device configured to be serviced by a network node, the wireless device being further configured to:
   receive, from the network node, an indication of a Listen-Before-Talk, LBT, setting corresponding to a weight to be applied by the wireless device when performing an LBT, wherein the LBT setting comprises an LBT algorithm and its corresponding one or more parameters; and
   apply the LBT setting of the received indication when performing the LBT,
   wherein the weight is for a bearer configured to be established between the network node and the wireless device and the weight is based on an indication of a quality of service associated with information configured to be transmitted in the bearer, and
   wherein in applying the LBT setting of the received indication, the wireless device is further configured to:
      transmit data associated with a higher indication of quality of service in one or more master carriers, and
      transmit data associated with a lower indication of quality of service in one or more slave carriers, the transmission in the one or more slave carriers being only performed after an outcome of a period of observation of a radio channel for transmission is that the radio channel is idle.

* * * * *